United States Patent
Blanke

(10) Patent No.: US 9,174,242 B2
(45) Date of Patent: Nov. 3, 2015

(54) ZIG-ZAG CLASSIFIER AND METHOD FOR CLASSIFYING FOR SEPARATING MATERIAL TO BE SEPARATED

(71) Applicant: KRONES AG, Neutraubling (DE)

(72) Inventor: Jörg Blanke, Mohrkirch (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/341,003

(22) Filed: Jul. 25, 2014

(65) Prior Publication Data

US 2015/0034532 A1  Feb. 5, 2015

(30) Foreign Application Priority Data

Jul. 31, 2013  (DE) .................. 10 2013 215 062

(51) Int. Cl.
  *B07B 4/04*  (2006.01)
  *B07B 4/02*  (2006.01)

(52) U.S. Cl.
  CPC .... *B07B 4/04* (2013.01); *B07B 4/02* (2013.01)

(58) Field of Classification Search
  CPC .................................. B07B 4/04; B07B 4/02
  See application file for complete search history.

(56) References Cited

U.S. PATENT DOCUMENTS

| | | | |
|---|---|---|---|
| 1,861,248 A |  | 5/1932 | Stebbins |
| 3,925,198 A | * | 12/1975 | Eckhoff et al. ................... 209/3 |
| 4,668,381 A | * | 5/1987 | Julius ............................. 209/39 |
| 4,931,174 A | * | 6/1990 | Uhlemann et al. ......... 209/139.1 |
| 4,946,654 A | * | 8/1990 | Uhlemann et al. ............. 422/140 |
| 5,181,617 A | * | 1/1993 | Lehrmann ....................... 209/31 |
| 5,213,820 A | * | 5/1993 | Uhlemann et al. ............. 425/222 |

FOREIGN PATENT DOCUMENTS

| | | | |
|---|---|---|---|
| CH | 419810 A | | 8/1966 |
| DE | 2623038 B1 | | 8/1977 |
| DE | 2641068 A1 | | 3/1978 |
| DE | 19744708 A1 | | 4/1999 |
| DE | 19906476 A1 | | 8/2000 |
| GB | 1014723 A | | 12/1965 |
| JP | 52011569 A | * | 1/1977 |
| JP | H0588671 U | | 12/1993 |
| JP | 2002001222 A | | 1/2002 |

OTHER PUBLICATIONS

Search Report for EP 14175356, dated Sep. 16, 2014.
Search Report for DE 10 2013 215 062.8, dated May 12, 2013.

* cited by examiner

*Primary Examiner* — Luis A Gonzalez
(74) *Attorney, Agent, or Firm* — Marshall, Gerstein & Borun LLP

(57) ABSTRACT

A zig-zag classifier for separating material to be separated, for example, plastic flakes, including two zig-zag-shaped plates which are arranged oppositely vertical to each other such that a channel is formed between them, where a central vertically disposed zig-zag-shaped separation plate between the two zig-zag-shaped plates is arranged such that the channel is divided into two parallel classifier channels having substantially the same width. Also, a method for separating material to be separated, for example, plastic flakes, using the zig-zag classifier disclosed herein.

18 Claims, 3 Drawing Sheets

ZIG-ZAG CLASSIFIER AND METHOD FOR CLASSIFYING FOR SEPARATING MATERIAL TO BE SEPARATED

CROSS-REFERENCE TO RELATED APPLICATION

The present application claims priority to German Application No. 10 2013 215 062.8, filed Jul. 31, 2013. The priority application, DE 10 2013 215 062.8 is hereby incorporated by reference.

FIELD OF THE DISCLOSURE

The disclosure relates to a zig-zag classifier for separating material to be separated, for example, plastic flakes, and a method for separating material to be separated, for example, plastic flakes.

BACKGROUND

A zig-zag classifier is adapted to separate supplied material to be separated in the classifier into a coarse and a fine fraction. It has shown that it is to be aspired for the surface of the classifier channel to have the following ratio: length/width≤4. The angle of the teeth of the zig-zag classifier ideally lies in the region of 120°.

The material to be separated is supplied via a supply device being sealed against the environment into the zig-zag classifier and is distributed across the entire cross-section of the classifier channel. The classifying air generated by the fan flows through the classifier from the bottom to the top, while it is blown through the material to be separated and separates it. As a result of the multiply angled classifier channel, the material to be separated is forced to perform a zig-zag-like motion. At each bend of the classifier channel, the material to be separated must traverse the air stream and then impact the oppositely disposed classifier wall. Air is blown preferably transversely against the constituents of the material to be separated when they change from one channel side to the other and thereby deflects them to a varying degree. In this, heavier constituents drop down into the classifier channel due to the force of gravity. The lighter constituents are carried upwardly by the upwardly directed airflow.

Good separation of lighter and heavier constituents is achieved due to the multiple directional changes in the classifier channel. The dimensions of the classifier channel as well as the speed of the classifying air and the load of material to be separated can vary depending on the materials and the performance. The spacing of the Z-shaped plates in the classifier channel creates a certain flow, where the spacing of the classifier channel for a particular material is approximately uniform. For larger throughputs, the classifier channel is therefore increased in depth so that transferring the material in and out through cellular wheel sluices becomes increasingly difficult.

SUMMARY OF THE DISCLOSURE

One aspect of the disclosure is to provide a zig-zag classifier which operates effectively even with larger throughputs and is suitable for materials having the most varied mixture ratios of light and heavy fractions that are to be separated.

Classifying is understood to mean the separation of constituents of material to be separated that are suitable for processing—for example, plastic flakes having a certain minimum weight—and that are un-suitable constituents—for example plastic flakes and/or foreign particles having a weight that is less than the minimum weight. This classifying occurs within classifier channels of the zig-zag classifier. In this, the material to be separated, being introduced via an inlet into the zig-zag classifier, is classified using classifying air, i.e. separated into the suitable and unsuitable portions.

A zig-zag classifier according to the disclosure for separating material to be separated, for example, plastic flakes, comprises two zig-zag-shaped plates which are arranged oppositely vertical to each other such that a channel is formed between them, where a central vertically disposed zig-zag-shaped separation plate between the two zig-zag-shaped plates is arranged such that the channel is divided into two parallel classifier channels having substantially the same width.

Due to the presence of two classifier channels, the throughput of the zig-zag classifier can be increased in comparison with a zig-zag classifier with only one classifier channel, without any increase in the length of the zig-zag classifier being required. The zig-zag classifier according to the disclosure can produce approximately twice the throughput while having the same external dimensions. Since the length of the zig-zag classifier also does not need to be chosen longer, a cellular wheel sluice for the supply of the material to be separated can be used without any problems.

The zig-zag classifier can further comprise a movement device being adapted to move the two zig-zag-shaped plates horizontally so that the width of the two parallel channels can be changed. By moving the two zig-zag-shaped plates, the width of the two classifier channels can be variably adapted to given parameters, such as the type of material to be separated, the load, the classifying air supply and/or to a desired separation selectivity, etc.

The movement device can be designed as being controllable by a control device, where the control device preferably accounts for the kind of material to be separated, the classifying air supply and/or a desired separation selectivity for controlling the transport device. It is therefore with the control device possible to automatically adapt the zig-zag classifier to given conditions.

The zig-zag classifier can further comprise two supply devices that are adapted to supply the zig-zag classifier with classifying air, where the two supply devices are each disposed along the length of the zig-zag classifier and laterally offset below each of the two classifier channels.

The supplied classifying air flows through the two classifier channels from the bottom upwardly, where the classifying air passes through the material to be separated—for example, plastic flakes—that is introduced from above the two classifier channels. As a result of the multiple angling by the zig-zag-shaped plates and the zig-zag-shaped separation plate, the material to be separated is forced into a zig-zag-like motion within the classifier channels. At each bend of the classifier channels, the material to be separated must traverse the classifying air stream and then impacts the oppositely disposed classifier wall. When changing from one side of the classifier channel wall to the other, the classifying air flows against the constituents of the material to be separated and deflects them to a different degree. In this, the heavier constituents—the so-called classifier heavy fraction—drops downward into the classifier channels due to the force of gravity. The lighter constituents—the so-called classifier light fraction—are carried upwardly by the upwardly directed classifying airflow.

The two supply devices can each have a tapering cross-section along the length of the zig-zag classifier. The cross-section can be larger in an initial region of the supply device than the cross-section in an end region of the supply device. The initial region can presently be seen as the region of the supply device in which the classifying air is introduced into the supply device from the exterior. The introduced classifying air moves from the initial region to the respective end region, where the end region seals the supply device in an air-tight manner.

The two supply devices can be of a conical design. The diameter can be larger in an initial region of the supply device than the diameter in an end region of the supply device. The initial region can presently be seen as the region in which the classifying air is introduced into the supply device from the exterior. The introduced classifying air moves from the initial region to the respective end region of a supply device where the end region seals the supply device in an air-tight manner.

The zig-zag classifier can comprise two extraction devices which are adapted to extract a portion of the classifying air and a light particle fraction from the zig-zag classifier, where the two extraction devices are each disposed along the length of the zig-zag classifier and laterally offset respectively above one of the two classifier channels.

The two supply devices can each have a tapering cross-section along the length of the zig-zag classifier. The cross-section can be larger in an initial region of the extraction device than the cross-section in an end region of the extraction device. An initial region can presently be seen as the region in which an extractor from the exterior connects, so that, for example, the portion of the classifying air and the classifier light fraction can be extracted via discharge lines. The extracted portion of the classifying air and the classifier light fraction can move from the end region to the respective initial region, where the end region closes the extraction device in an air-tight manner.

The two extraction devices can have a conical design. The diameter can be larger in an initial region of the extraction devices than the diameter in an end region of the extraction devices. An initial region can presently be seen as the region in which extractors from the exterior connect, so that, for example, the portion of the classifying air and the classifier light fraction can be extracted via discharge lines. The extracted portion of the classifying air and the classifier light fraction can move from the end region to the respective initial region, where the end region closes the extraction device in an air-tight manner.

The zig-zag classifier can further comprise a supply device for material to be separated which is designed to supply material to be separated from above the two classifier channels to the zig-zag classifier, where the supply device for material to be separated is preferably designed as a cellular wheel sluice. The supply device for material to be separated is preferably designed such that the material to be separated can be introduced uniformly, e.g. in the same quantity proportion, at the same supply speed, into the two classifier channels.

Since the length of the zig-zag classifier also does not need to be chosen longer, a cellular wheel sluice for the supply of the material to be separated can be used without any problems. The cellular wheel sluice allows the supply region of the material to be separated in the zig-zag classifier to be sealed in an air-tight manner so that any escape of the classifying air from the zig-zag classifier and the intake of ambient air via the supply region can be prevented.

The zig-zag classifier can further comprise a hopper which is designed to output a classifier heavy fraction from the zig-zag classifier, where the hopper preferably comprises a cellular wheel sluice. The classifier heavy fraction can accumulate below the two classifier channels in the hopper and from there the classifier heavy fraction can be supplied to further processing or to further separation in the zig-zag classifier—or possibly be returned to the zig-zag classifier with modified classifier channel width and/or modified classifying air supply.

In addition, the zig-zag classifier can comprise an adjustable distribution plate which is arranged slidably on the zig-zag-shaped separation plate. The distribution plate is preferably disposed slidably in the upper region of the zig-zag-shaped separation plate, where the distribution plate can slide up and down along the surface of the upper region of the separation plate and parallel to the orientation of the side edge of the upper region of the separation plate. It is thereby possible to change the entry region in the two classifier channels, thereby achieving uniform distribution of the material to be separated, being supplied, for example, by a supply device for material to be separated, in the two classifier channels.

The disclosure further comprises a method for separating material to be separated, for example, plastic flakes, using a zig-zag classifier as described above and/or further below.

BRIEF DESCRIPTION OF THE FIGURES

Further advantages and embodiments arise from the accompanying drawings: Bottles are used as containers in the drawings by way of example. In the drawings.

DETAILED DESCRIPTION

Figure 1:
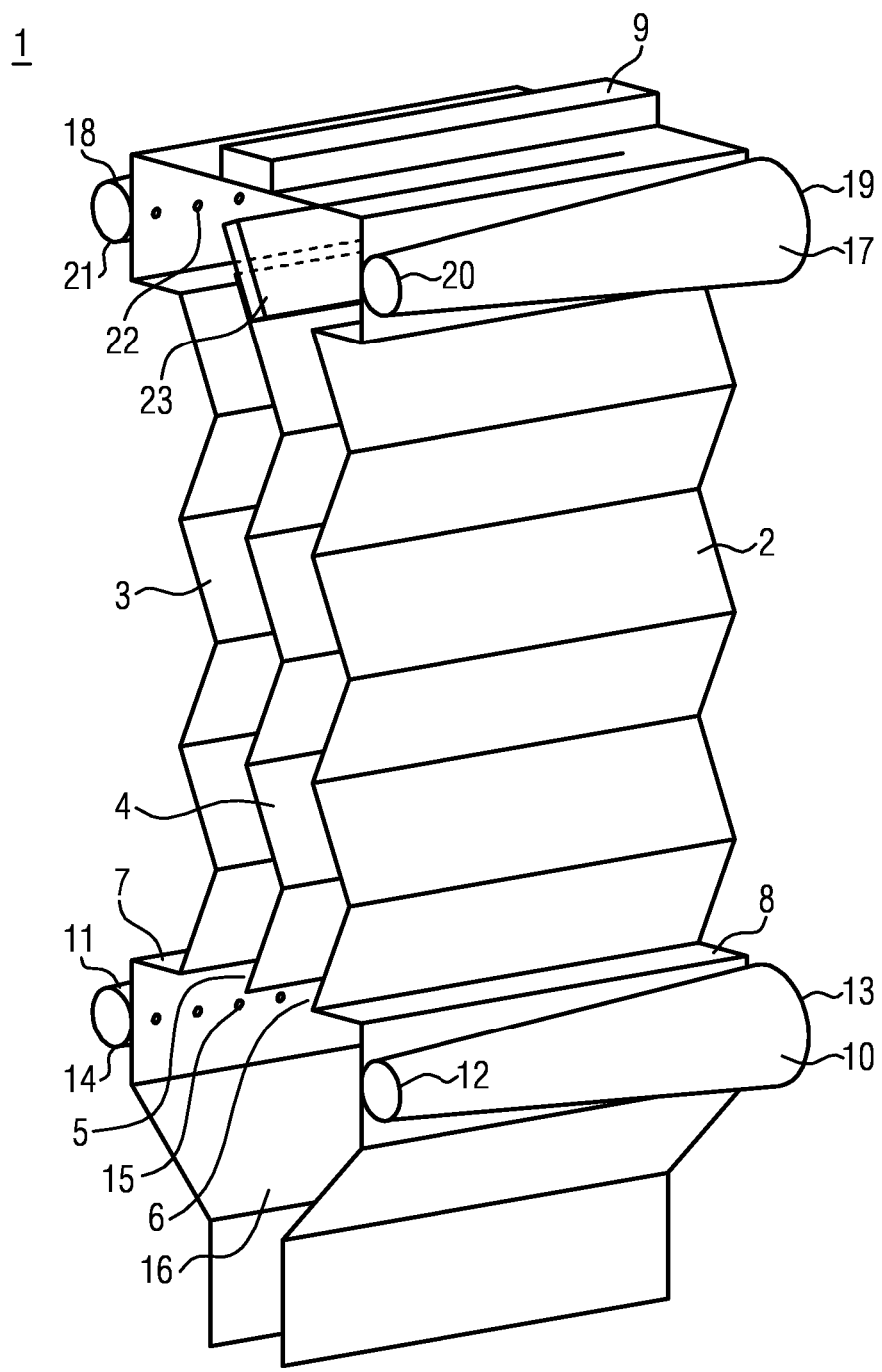
FIG. 1 shows a schematic view of a zig-zag classifier for separating plastic flakes.

FIG. 1 shows a schematic view of a zig-zag classifier 1 for separating plastic flakes.

The zig-zag classifier 1 comprises two zig-zag-shaped plates 2, 3 which are arranged oppositely vertical to each other such that a channel is formed which is divided into two parallel classifier channels 5, 6 of equal width by a vertically disposed zig-zag-shaped separation plate 4 disposed centrally between the two zig-zag-shaped plates 2, 3.

The two zig-zag-shaped plates 2, 3, can with movement devices 7, 8 be horizontally moved such that the width of the two parallel classifier channels 5, 6 can be changed. The movement device 7, 8 can be controlled by a control device (not shown) which, for example, accounts for the type of material to be separated, the classifying air supply and/or the desired degree of separation selectivity and/or the like.

The material to be separated is supplied from above the classifier channels using a supply device 9 for the material to be separated, for example, using a cellular wheel sluice. A cellular wheel sluice allows the supply region of the material to be separated in the zig-zag classifier 1 to be sealed in an air-tight manner so that escape of the classifying air from the zig-zag classifier 1 and the intake of ambient air via the supply region can be prevented.

In order to uniformly distribute the material to be separated into the two classifier channels 5, 6, a distribution plate 23 is provided which is slidably disposed in the upper region of the separation plate 4. The distribution plate 23 can slide up and down along the surface of the upper region of the separation plate 4 and parallel to the orientation of the side edge of the upper region of the separation plate 4. It is thereby possible to change the entry region in the two classifier channels 5, 6, thereby achieving uniform distribution of the material to be separated which is supplied, for example, by the supply device 9 for the material to be separated, in the two classifier channels 5, 6.

The material to be separated is in the two classifier channels 5, 6 separated into a classifier light fraction and a classifier heavy fraction by the classifying air supplied from below into the channels and by the gravity acting upon the material to be separated.

The supply devices 10, 11 for the classifying air are each designed in a conical manner, extend along the length of the zig-zag classifier 1, and are disposed laterally offset below the two classifier channels 5, 6. The diameter is larger in an initial region 13 of the supply device 10, 11 than the diameter in an end region 12, 14 of the supply device 10, 11. An initial region 13 is presently to be seen as the region in which the classifying air is introduced into the supply devices from the exterior, for example, via supply lines. The introduced classifying air moves from the initial region 13 to the respective end region 12, 14 of a supply device 10, 11, where the end region 12, 14 seals the supply device 12, 14 in an air-tight manner. The classifying air introduced into the supply devices 12, 14 is introduced via perforations 15 in the supply devices 10, 11 being disposed along the length of the zig-zag classifier 1 into the zig-zag classifier 1 and then flows through the two classifier channels 5, 6 from the bottom upwardly. Due to the conical design of the supply devices 10, 11, uniform classifying air flow is generated across the entire length of the zig-zag classifier 1, resulting in uniform distribution of the classifying air across the length as well as the width of the classifier channels 5, 6. To evenly vary the classifying air flow rate in the two classifier channels 5, 6, only the classifying air supply—for example, the flow rate—in the initial region 13 of the supply device 10, 11 needs to be changed.

The classifying air flows through the two classifier channels 5, 6 from the bottom upwardly, where the classifying air passes through the material to be separated that is introduced from above the two classifier channels 5, 6. As a result of the multiple angling by the zig-zag-shaped plates and the zig-zag-shaped separation plate, the material to be separated is forced into a zig-zag-like motion within the classifier channels 5, 6. At each bend of the classifier channels 5, 6, the material to be separated must traverse the classifying air stream and then impacts the oppositely disposed classifier wall. When changing from one side of the classifier channel wall to the other, the classifying air flows against the constituents of the material to be separated and deflects them to a different degree. In this, the heavier constituents—the so-called classifier heavy fraction—drop downward into the classifier channels 5, 6 due to the force of gravity. The lighter constituents—the so-called classifier light fraction—are carried upwardly by the upwardly directed classifying airflow.

The extraction devices 17, 18 for the classifier light fraction are each conical in design, where a portion of the classifying air and the classifier light fraction are extracted via the extraction devices 17, 18. In this, the extraction devices 17, 18 extend along the length of the zig-zag classifier 1 and are disposed laterally offset above the two classifier channels 5, 6. The diameter is larger in an initial region 19 of the extraction devices 17, 18 than the diameter in an end region 20, 21 of the extraction devices 17, 18. An initial region 19 is presently to be seen as the region in which extractors from the exterior connect, so that for, example, the portion of the classifying air and the classifier light fraction are extracted via discharge lines. The extracted portion of the classifying air and the classifier light fraction move from the end region 20, 21 to the respective initial region 19 of the extraction device 17, 18, where the end region 20, 21 closes the extraction device 17, 18 in an air-tight manner. Extracting the portion of the classifying air and the classifier light fraction is performed via perforations 22 in the extraction devices 17, 18 which are arranged along the length of the zig-zag classifier 1.

The two classifier channels 5, 6 terminate in a common space and the classifier heavy fraction is collected using a hopper 16 below the two classifier channels 5, 6 and can be outputted, for example, using a cellular wheel sluice. The classifier heavy fraction can then be supplied to further processing or for further separation be returned to the zig-zag classifier 1—possibly with modified classifier channel width, modified classifying air supply.

Figure 2:
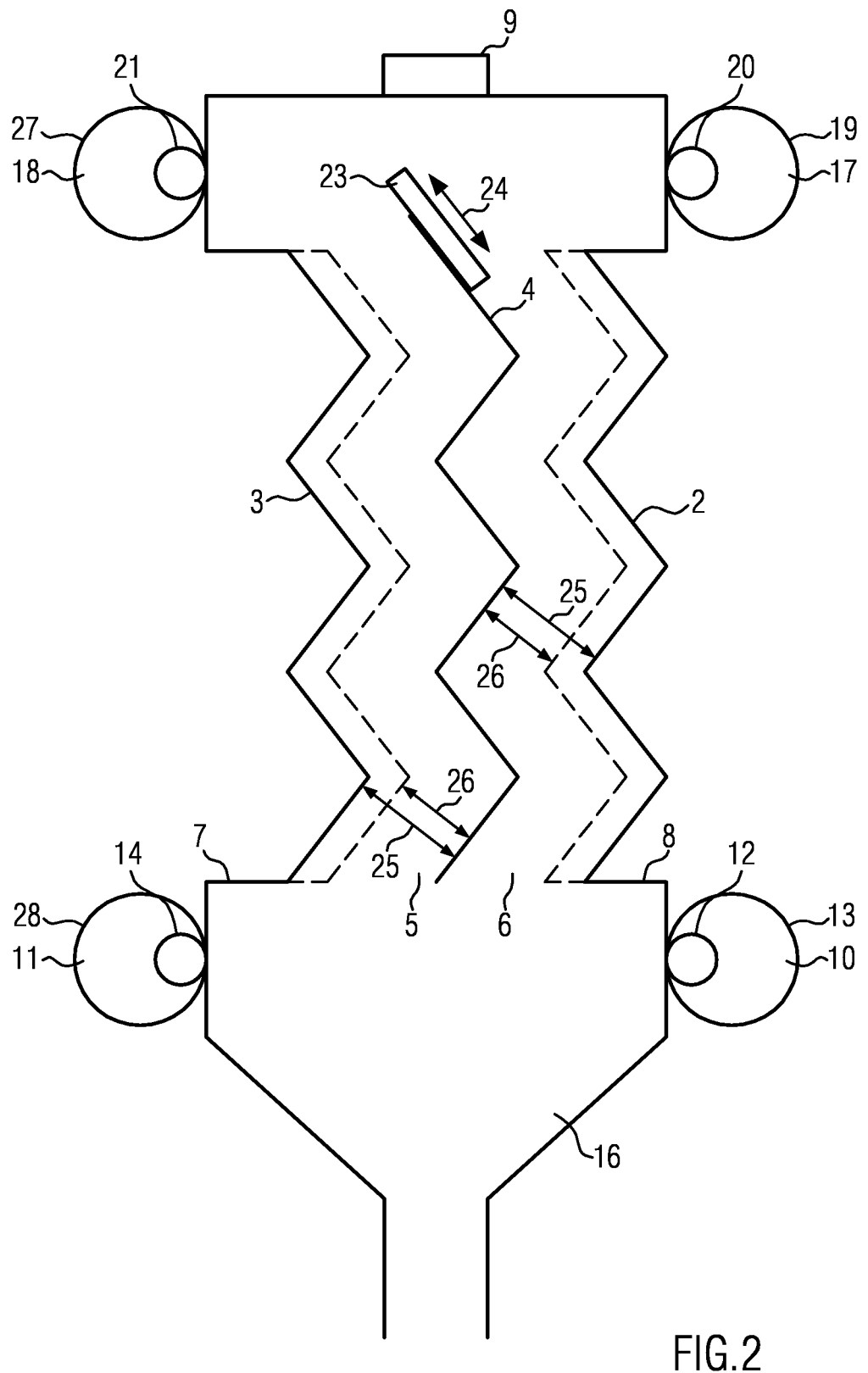
FIG. 2 shows a cross-section through the zig-zag classifier of FIG. 1.

FIG. 2 shows a cross-section through the zig-zag classifier that is illustrated in FIG. 1. In a first arrangement, the two classifier channels 5, 6 comprise a first width 25. In a second arrangement, the two zig-zag-shaped plates 2, 3 (represented by dashed lines) have been slid horizontally using the movement device 7, 8 so that two classifier channels 5, 6 result having a second, smaller width 26 as compared to the first arrangement. The distribution plate 23 can in the direction 24 illustrated slide up and down along the surface of the upper region of the separation plate 4.

Figure 3:
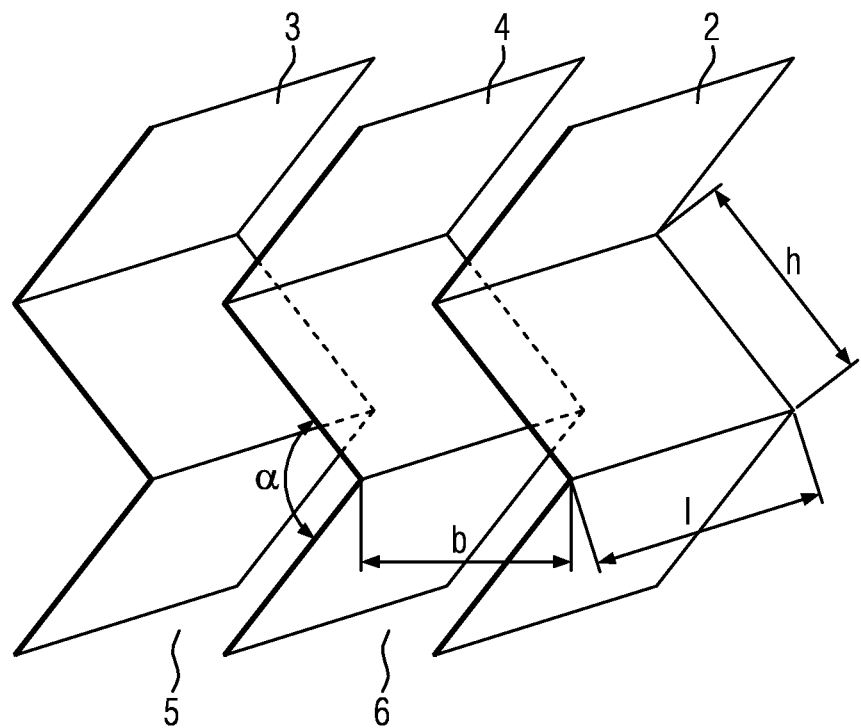
FIG. 3 shows a definition for measurements given for the zig-zag classifier.

FIG. 3 shows a schematic view of the two zig-zag-shaped plates 2, 3 and of the zig-zag-shaped separation plate 4 of a zig-zag classifier 1 with which angle $\alpha$ of the teeth of the zig-zag classifier 1, width b of a classifier channel 5, 6, depth l of the classifier channel and height h of a tooth are explained. Width b of a classifier channel 5, 6 is given by the distance of one of the zig-zag-shaped plates 2, 3 to the zig-zag-shaped separation plate 4.

The invention claimed is:

1. A zig-zag classifier for separating material to be separated, comprising:
    two zig-zag-shaped plates which are arranged oppositely vertical to each other such that a channel is formed between them:
    a central vertically disposed zig-zag-shaped separation plate between said two zig-zag-shaped plates arranged such that said channel is divided into two parallel classifier channels having substantially the same width; and
    a movement device, said two zig-zag-shaped plates being horizontally movable via the movement device, such that said widths of said two parallel channels can be changed.

2. The zig-zag classifier according to claim 1, and said movement device being controllable by a control device.

3. The zig-zag classifier of claim 2, and the control device accounts for one of a kind of material to be separated, a classifier air supply, and a desired separation selectivity for controlling said movement device.

4. The zig-zag classifier according to claim 1, and further comprising two supply devices that are adapted to supply said zig-zag classifier with classifying air, and each of said two supply devices being disposed along the length of said zig-zag classifier and laterally offset below each of said two classifier channels.

5. The zig-zag classifier according to claim 4, and said two supply devices each have a tapering cross-section along the length of said zig-zag classifier.

6. The zig-zag classifier according to claim 4, and said two supply devices have a conical design.

7. The zig-zag classifier according to claim 1, and further comprising two extraction devices which are adapted to extract a portion of said classifying air and a light particle fraction from said zig-zag classifier, and said two extraction devices are each disposed along the length of said zig-zag classifier and laterally offset above each one of said two classifier channels.

8. The zig-zag classifier according to claim 7, and said two extraction devices each have a tapering cross-section along the length of said zig-zag classifier.

9. The zig-zag classifier according to claim 7, and said two extraction devices have a conical design.

10. The zig-zag classifier according to claim 1, and further comprising a supply device for material to be separated which is designed to supply material to be separated from above said two classifier channels to said zig-zag classifier.

11. The zig-zag classifier of claim 10, and said supply device for material to be separated is designed as a cellular wheel sluice.

12. The zig-zag classifier according to claim 1, and further comprising a hopper which is designed to output a classifier heavy fraction from said zig-zag classifier.

13. The zig-zag classifier of claim 12, and said hopper comprises a cellular wheel sluice.

14. The zig-zag classifier according to claim 1, and further comprising an adjustable distribution plate which is arranged slidably on said zig-zag-shaped separation plate.

15. The zig-zag classifier of claim 1, and the material to be separated comprise plastic flakes.

16. A method for separating material to be separated, and using a zig-zag classifier according to claim 1, the method comprising:
   moving the two zig-zag-shaped plates horizontally using the movement device to change the width of the two parallel classifier channels;
   supplying the material to be separated from above to the two classifier channels;
   supplying classifying air from below into the two classifier channels, wherein the classifier air passes through the material to be separated that has been introduced from above to the two classifier channels, and separating the material to be separated into a classifier light fraction and a classifier heavy fraction.

17. The method according to claim 16, wherein the supplying the material to be separated from above to the two classifier channels comprises supplying plastic flakes.

18. The method according to claim 16, when using the zig-zag classifier according to claim 3, the method further comprising:
   controlling the movement device by using a control device that takes accounts for at least one of the group of a kind of material to be separated, a classifier air supply, and a desired separation selectivity.

\* \* \* \* \*